United States Patent [19]
Alaze et al.

[11] Patent Number: 5,108,160
[45] Date of Patent: Apr. 28, 1992

[54] METHOD AND APPARATUS FOR FEEDBACK-FREE ABS CONTROL

[75] Inventors: Norbert Alaze, Markgroeningen; Johannes-Gerhard Bertling, Vaihingen/Enz, both of Fed. Rep. of Germany

[73] Assignee: Robert Bosch GmbH, Stuttgart, Fed. Rep. of Germany

[21] Appl. No.: 545,747

[22] Filed: Jun. 29, 1990

[30] Foreign Application Priority Data

Jul. 1, 1989 [DE] Fed. Rep. of Germany ....... 3921682

[51] Int. Cl.$^5$ ............................................. B60T 8/42
[52] U.S. Cl. ...................... 303/115 FW; 303/116 SP; 303/87
[58] Field of Search ................. 303/87, 113, 115–117, 303/DIG. 1, DIG. 2, 113 R, 115 PP, 115 FM, 116 SP

[56] References Cited

U.S. PATENT DOCUMENTS

| 3,994,538 | 11/1976 | Farr | 303/119 X |
| 4,072,366 | 2/1978 | Kondo | 303/116 |
| 4,422,695 | 12/1983 | Farr | 303/116 X |
| 4,428,624 | 1/1984 | Farr | 303/116 |
| 4,938,541 | 7/1990 | Shaw et al. | 303/116 X |

FOREIGN PATENT DOCUMENTS

| 71360 | 4/1985 | Japan | 303/115 |
| 2101246 | 1/1983 | United Kingdom | 303/115 |

OTHER PUBLICATIONS

Bosch Technische Berichte [Technical Reports]7 (1980), pp. 75 and 76.

Primary Examiner—Douglas C. Butler
Assistant Examiner—Alfred Muratori
Attorney, Agent, or Firm—Edwin E. Greigg; Ronald E. Greigg

[57] ABSTRACT

In a hydraulic brake system for feedback-free ABS control for mobile units, motor vehicles, motorcycles and the like, it is proposed that partial hydraulic units be provided in accordance with the number of desired closed and optionally also open brake circuits, and that the actuating piston of each shutoff valve provided in each partial hydraulic unit and interrupting the communication between the master brake cylinder and the associated wheel brake cylinder and simultaneously opening the communication between the wheel brake cylinder and a plunger-piston, with a pressure equalization face, which is acted upon in parallel with the pressure from the master brake cylinder line. As a result, given suitable embodiment and adaptation of the remaining pressure faces of the actuating piston, a pressure equilibrium is obtained in the sense of compensation for the working pressures exerted. It then becomes possible to embody the triggering pressure for the actuating piston in the shutoff valve independently of the pressure in the master brake cylinder, and to derive it for instance from a high-pressure pump, which starts at the onset of ABS control, without further modification.

28 Claims, 3 Drawing Sheets

Fig.2

METHOD AND APPARATUS FOR FEEDBACK-FREE ABS CONTROL

RELATED APPLICATIONS

This application relates to subject matter generally similar to other applications filed simultaneously by the same assignee, the applications being identified by German Patent Appl. Nos. P 39 21 683.7 and P 39 21 681.0, R.22749 and R.22747, respectively, and further identified by Ser. Nos. 07/546,594 and 07/545,749, filed in the U.S. Patent and Trademark Office on Jun. 29, 1990.

BACKGROUND OF THE INVENTION

The invention relates to a method and an apparatus for performing a feedback free ABS control.

Generally, the use of so-called plunger systems, which are capable of achieving ABS operation without perceptible feedback in the brake pedal of the master brake cylinder, is known in various forms, for instance from Bosch Technische Berichte [Technical Reports] 7 (1980), page 76, FIG. 14b, where a plunger operating pump with its own supply is disclosed that can be selectively used to jointly supply a brake booster as well.

The basic function of a hydraulic control unit for feedback-free ABS operation using plunger-pistons is known, for instance from the article entitled "Mehr Sicherheit beim Bremsen" [Increased Safety When Braking] from the periodical *Fluid*, January 1984, page 10. In the customary manner, this known hydraulic control system for an anti-skid braking system includes wheel sensors, a control and regulation electrode, and the hydraulic control unit. The hydraulic control unit provides a check valve in the connecting line between the pedal-actuated master brake cylinder and the various wheel brake cylinders, along with a plunger-piston connected parallel to and downstream of the check valve, which upon triggering in the ABS mode diverts a volume of pressure fluid from the line and from the connected wheel brake cylinders, and as a result closes the check valve toward the master brake cylinder and then independently thereof realizes the ABS function as needed during operation. The electronic control and regulation system assures that the pressure that takes the various road conditions into account is established by means of predetermined pressure gradients in the brake system. If the pedal force at the master brake cylinder is lessened, the check valve can open again, so that the line between it and the connected wheel brake cylinders becomes free again.

In the same way, it is known to dispose controlled check valves between the master brake cylinder and to combine a wheel brake with a plunger cylinder (German Offenlegungsschrift 2 045 689); the actuation of the plunger cylinder is done via an auxiliary pressure by means of a magnetic valve.

OBJECT AND SUMMARY OF THE INVENTION

It is the object of the invention, in a feedback-free ABS control in hydraulic braking, to assure that despite the use of an auxiliary pump pressure with an arbitrarily embodied pressure level for the switchover to ABS function and for the action on the plunger, which may for instance be uncontrolled high pump pressure, a compensation for the pressures in the hydraulic unit controlled by the ABS system and specified by the driver can be accomplished.

The invention attains this object by the means narrated herein and has the advantage that both for plunger control and for effecting the switchover between normal braking operation and the performance of ABS functions by triggering a hydraulically actuated shutoff valve, no controlled actuating pressure is necessary; instead, direct action upon the various elements is possible by means of a high-pressure pump that begins its operation at the instant the ABS functions start. This triggering or actuating pressure of the high-pressure pump can therefore be independent of the pressure in the master brake cylinder, because by means of a specialized compensation face a compensation can be made between the controlled and the uncontrolled actuating pressure.

A particular advantage of the present invention is that whenever a feedback-free ABS control is given preference, an association and combination for arbitrary braking variants and brake boosters in the closed brake circuit is possible.

The invention will be better understood and further objects and advantages thereof will become more apparent from the ensuing detailed description of preferred embodiments taken in conjunction with the drawings.

DESCRIPTION OF THE PREFERRED EMBODIMENTS

The basic concept of the present invention is to provide a hydraulically actuated shutoff valve with satisfactory pressure equalization, in a multi-channel plunger ABS for motor vehicles, motorcycles or the like, the pressure equalization being satisfactory even though the triggering pressure for actuating the tappet or switching piston in the shutoff valve is independent of the pressure in the master brake cylinder. By means of corresponding compensation faces, compensation can be made for the working pressures present at the shutoff valve.

Figure 1:
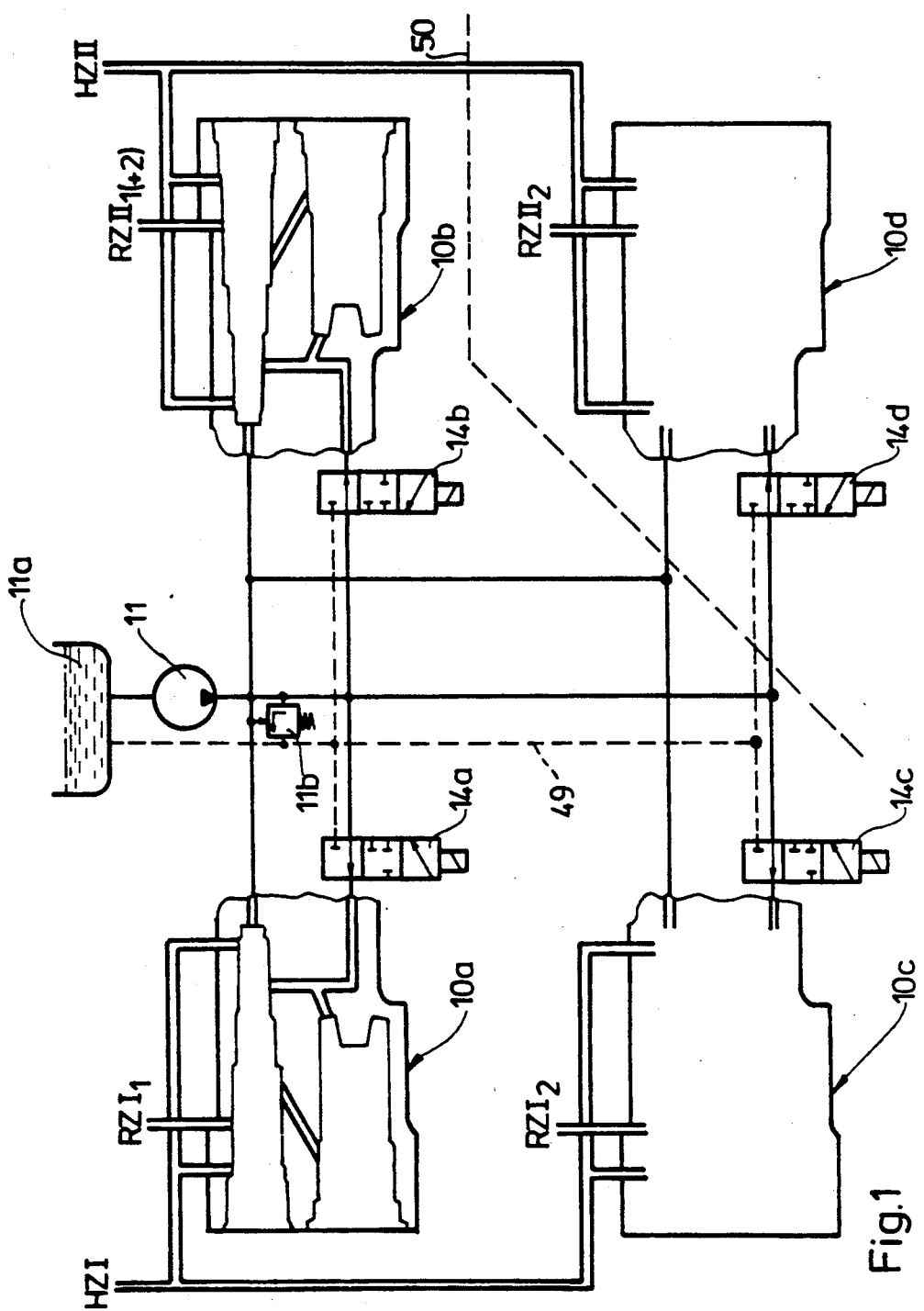
FIG. 1 schematically shows a hydraulic switching diagram for a separate four-channel hydraulic unit for feedback-free ABS control in hydraulic brakes.

FIG. 1 shows a four-channel hydraulic unit showing a plunger system for separate ABS, which offers feedback-free ABS control for arbitrary brake variance and brake boosters. The hydraulic unit, in the four-channel version, has four partial hydraulic units 10a, 10b, 10c and 10d, which are each connected to a common high-pressure pump 11 and each is associated with one wheel brake cylinder RZ. The various brake pressure outlets to the wheel brake cylinders are shown in FIG. 1 as $RZI_1$, $RZI_2$ and $RZII_1$ and $RZII_2$. The reference symbol I refers to a first, common (closed) brake circuit, and reference symbol II refers to a second (closed) brake circuit, independent of the first.

Figure 2:
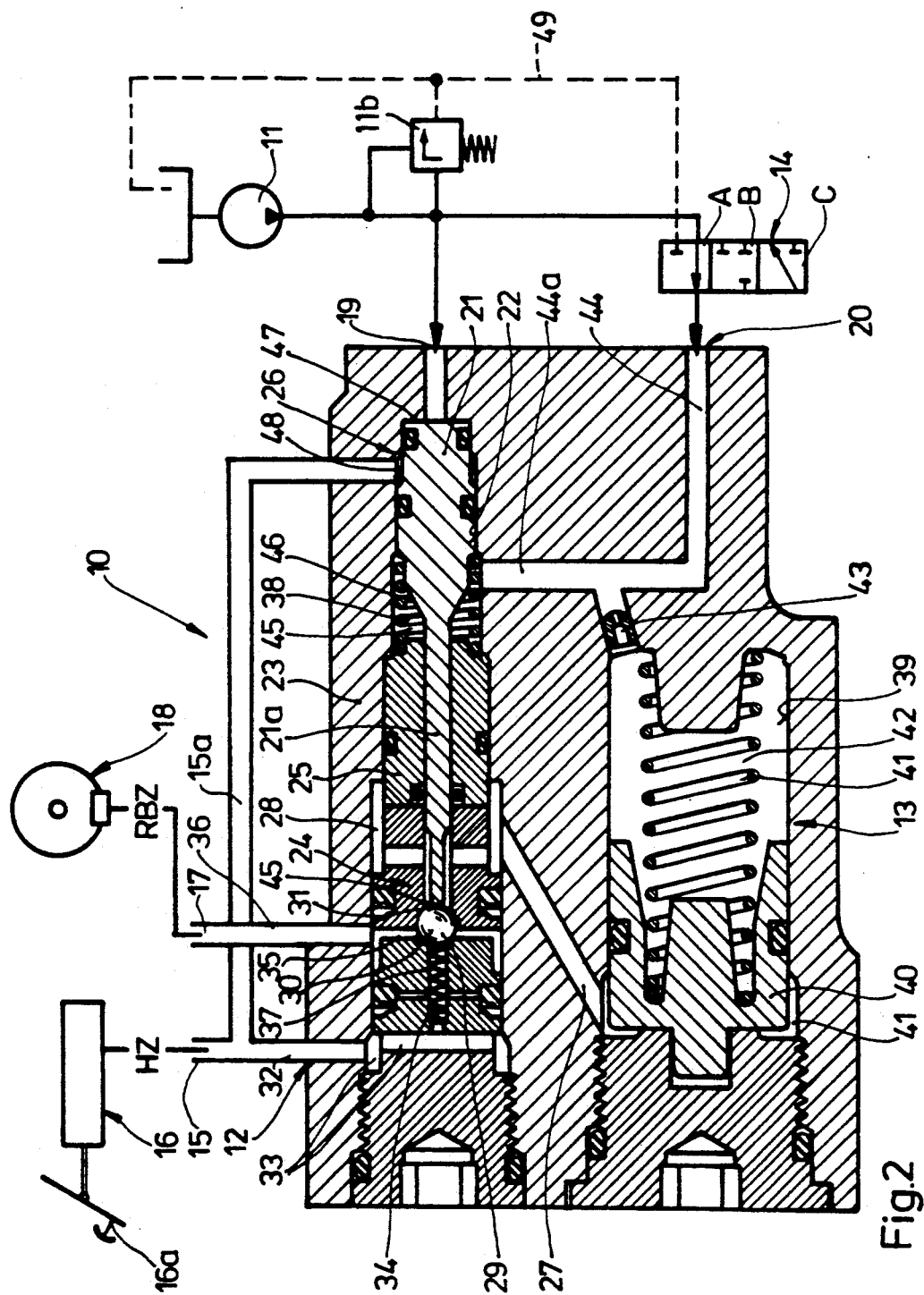
FIG. 2 is an enlarged view of the partial hydraulic units used in FIG. 1, comprising the combination of a hydraulically actuated shutoff valve and a plunger-piston.

For better comprehension of the invention, the following discussion, referring to FIG. 2, will provide more detail of the structure of a partial hydraulic unit 10. This structure is identical for all the partial hydraulic units shown in FIG. 1 and in the following drawings and each is arranged accordingly, so that the explanation provided in conjunction with FIG. 2 is applicable to all the exemplary embodiments; also, for the sake of simplicity, at least some of these partial hydraulic units 10 have been shown only in outline form in FIGS. 1-3.

The partial hydraulic unit 10 of FIG. 2 includes a hydraulically actuated shutoff valve 12 and an associated plunger-piston arrangement 13 adapted to cooperate with the shutoff valve 12; also belonging to these two partial units is the typical ABS valve 14, in the likewise typical 3/3-way version, with the following switching positions: A="increase pressure"; B="maintain pressure"; and C="reduce pressure". All or only certain ones of the partial units can be disposed in a common housing or each in separate housings; in the embodiment of FIG. 2, a common housing is provided for the hydraulically actuated shutoff valve 12 and the area of the plunger-piston 13.

The partial hydraulic unit 10 of FIG. 2 has a total of four connections to the outside, namely a first connection 15 that comes from a master brake cylinder 16 with its actuating pedal 16a; a second outlet connection 17 that leads to one or more wheel brake cylinders connected to it, these cylinders being merely suggested at 18 in FIG. 2; a third switch inlet connection 19, which communicates with the area of a high-pressure pump; and finally a fourth control inlet connection 20, which is formed by the outlet of the 3/3-way ABS control valve 14.

The hydraulically actuated shutoff valve 12 in the exemplary embodiment shown is a 3/2-way switchover valve, and its task, upon the onset of ABS functions, is to break the communication between the master brake cylinder 16 and the wheel brake cylinder or cylinders connected to it and to switch the area of the wheel brake cylinder to the plunger-piston system, which is acted upon via the ABS control and ABS valve 14 accordingly and achieves the applicable ABS function. To this end, the shutoff valve 13 has a switching or actuating piston 21, which is mounted displaceably in a stepped cylinder bore 22 of the housing 23 common to both the shutoff valve and the plunger-piston, and which has a piston-rod-like extension 21a that extends to the left, in the plane of the drawing of FIG. 2, as far as the actual valve area 24. The piston-rod-like extension will hereinafter be called the actuating rod 21a; it pierces a stationary sealing stopper 25, which has an inner slide guidance bore for the actuating rod 21a, and separates the valve area 24 from the switchover actuation area 26 having the actuating piston 21. The offset front end region of the actuating rod 21a, which is also offset for the purpose of assuring the flow to and from the plunger-piston to the valve area via the connecting line 27 and the annular channel 28, determines the respective valve position of a basically loose valve ball 29, to which two valve seats opposite one another, as viewed in the axial direction of the shutoff valve, are assigned and which can therefore assume two closing positions, namely one seated on a first valve seat 30 for shutting off the supply line coming from the master brake cylinder 16, and one seated on a second valve seat 31 for shutting off the communication between the wheel brake cylinder and the plunger-piston.

This latter valve seat position, that is, the one in contact with the valve seat 31, is the normal braking position or ABS function. It can be seen that in this case the communication from the inlet connection 15 from the master brake cylinder 16 to the wheel brake cylinder 18, via the line 32, the inner connecting channels 33 and longitudinal channel 34, along the valve seat 30 with a transverse channel 35, to the connecting channel 36 via the outlet connection 17, is open.

The other switching position is defined by the contact of the valve ball 29 on the seat 30; preferably, the stroke of the valve ball 29 between these two valve seats is quite short, and in the exemplary embodiment amounts to only 1 or 2 mm, but this is not to be considered limiting.

In this other seating position the connecting channel 27 is open via the annular channel 28, along the seat 31 and back to the outlet channel 36 to the wheel brake cylinder 18, while the communication with the master brake cylinder is completely closed. Because this other seating position serves to achieve ABS functions, it will be clear that this involves a feedback-free ABS control, in which the control process (pressure oscillations of the hydraulic pressure fluid in the area of the plunger-piston to the wheel brake cylinder) cannot be felt in the brake pedal 16a associated with the master brake cylinder 16, regardless of the form of embodiment of the master brake cylinder, nor even in the embodiment as a brake booster with a brake pressure valve.

In the area of the hydraulically actuated shutoff valve, two prestressing springs are also provided, specifically a first prestressing spring 34, which acting upon the valve ball 29 presses it against its seat 31 and thus defines the normal braking state with open communication between the master brake cylinder and the wheel brake cylinder or cylinders, and a second prestressing spring 38, which correspondingly forces the actuating piston 21 and actuating rod 21a toward the right in the plane of the drawing until meeting the bottom of the cylinder bore, so that the valve ball 29 is liberated in this seat position. The springs in the system and in particular the prestressing spring 38 for the actuating piston, are dimensioned preferably such that they substantially overcome any forces of friction and sealing that occur.

The plunger-piston assembly 13 includes a plunger-piston 40 slidably displaceably supported in a continuous guide bore 39 of the housing 23; the plunger-piston 40 is pressed into its starting position shown on the left in FIG. 2 via a prestressing spring 41. The plunger-piston 40 divides the cylindrical guide 39 into two work chambers: a left-hand work chamber 41, which communicates with the wheel brake cylinder 18 when the shutoff valve is switched accordingly, and the right-hand work chamber 42, which communicates via a throttle 43 with the control pressure inlet 20 switched by the ABS valve 14. The (inner) connecting line 44 that extends from the control pressure inlet 20 splits into a branch line 44a, which discharges into the spring chamber 45 of the hydraulically actuated shutoff valve and thus subjects the control pressure coming from the ABS valve 14 to the front face of the actuating piston.

The actuating piston has a total of four different pressure faces, namely:

the pressure face 45 of the front of the actuating rod (extending as far as the corner regions stepped farther to the right and acting as a seal);

the restoring-spring-loaded front side 46 of the actuating piston 21;

the back side 47 of the actuating piston 21; and finally, a compensation face 48.

This compensation face 48 is formed because of a tapering in the rear portion, that is, the portion on the right in the plane of the drawing in FIG. 2, of the actuating piston—in combination with a corresponding stepping off of the housing slide bore 22 -and is acted upon continuously via a branch line 15*a* by the pressure coming from the master brake cylinder 16.

The following rules for dimensions should be observed: The area of the compensation face 48 and of the rod should be selected to be equal, thus providing compensation for the working forces, because as a result the remaining areas of the front and back side of the actuating piston 21 are also of equal size, so that the controlled and uncontrolled actuating pressure can compensate for one another. The two seat faces of the valve ball 29 against which the front end of the actuating rod of the actuating piston 21 presses should also be approximately equal to the surface area of the actuating rod.

This adaptation of the pressure faces among one another in combination with the compensation face 48 acted upon by the pressure of the master brake cylinder makes it possible to introduce an arbitrarily high switching pressure for the shutoff valve that is to be actuated hydraulically, without requiring adaptation to the pressure generated by the master brake cylinder in the event that ABS functions are achieved, because normally the servo pressure needed for the shutoff valve would have to be equal to the master brake cylinder pressure. This set of problems is addressed here by the pressure disconnection via the partial line 15*a* from the master brake cylinder to the compensation face 48. In this way a complete pressure compensation is achieved with little play, and the following basic functions arise in succession, and will now be described in further detail.

In normal braking operation, the valve ball 29 is located in contact with its right-hand seat; the communication from the master brake cylinder to the wheel brake cylinder is opened, and all the other lines, work chambers and pressure faces remain pressure-free.

The startup of the high-pressure pump 11 is effected on onset of ABS control. This by itself, however, does not yet provide any switchover of the shutoff valve 12, because the pressure forces on the faces 46 and 47 cancel each other out. If the ABS valve 14 is then moved into the pressure reduction position C, the switchover of the shutoff valve 12 into the other position is effected. The pressure of the high-pressure pump acts upon the back side 47 of the actuating piston, so that the valve ball 29, via the action of the actuating rod 21*a*, is pressed onto its other seat 30. The communication between the master brake cylinder 16 and the wheel brake cylinder 18 is interrupted, and the communication between the latter and the plunger-piston 40 or its front work chamber 41 is opened. Via the throttle 43, positively displaced pressure fluid can flow out of the plunger chamber into the reservoir return line 49. The actuation of the plunger-piston is always effected by the pump pressure of the high-pressure pump 11, and the positively displaced fluid must pass through the throttle bore of the throttle 43 in both directions. As a result, in combination with the electronically brought about switching motions of the ABS valve 14, it is possible to vary the pressure gradient in the wheel brake cylinders, and it can be assumed in this connection that on average, the pressure reaching the branch channel 44*a* via the magnetic valve 14 and from that channel reaching the actuating piston front is always less than the full high-pressure pump switching pressure upon the back side of the piston. Line cross sections and other throttle resistances, sometimes intentional, such as in the partial line 44*a*, also play a role here. The correct adaptation of the throttle 4 to the vehicle to be equipped therefore remains an important task. On the other hand the pressure equilibrium that as noted prevails in the area of the shutoff valve assures that the driver will have the option of acting upon the brake system, via the brake pedal 16*a* and the pressure generated by it in the master brake cylinder 16, and of specifying the pressure prevailing in the wheel brake cylinder. In this connection it should also be noted that in the case of ABS functions and with a closed shutoff valve (that is, one which is closed with respect to the interruption of the pressure line between the master brake cylinder and the wheel brake cylinder), the pressure generated by the plunger-piston 40 acts upon the valve ball 29 and also has feedback on the rod surface—although only in the case of pressure buildup via the ABS magnetic valve 14. These pressure equilibriums, given existing master brake cylinder pressure, which then acts upon the compensation face 48 as well, assure that under the influence of the actuating piston 21, the valve ball 29 will remain in the closing position; the switchover does not take place until the pressure of the master brake cylinder is overcome or is reduced to below the wheel cylinder pressure, and the switchover is imposed via the ABS valve 14 on the restoring-spring-loaded front side of the actuating piston 21 as well.

It can be presumed that as a result of the throttle action in the ABS valve in the case of ABS functions, that is, in dynamic operation, a complete pressure equilibrium cannot occur. In other words, the actuating piston end face pressure (upon the back side), which after all is not switched, predominates and assures the freedom from feedback of the initiated ABS function.

It can be seen that by the use of this kind of hydraulic unit or partial hydraulic unit with a shutoff valve and plunger, feedback-free ABS functions are possible with an arbitrarily produced master brake cylinder pressure, independently of the servo pressure derived from the high-pressure pump 11 for the ABS situation.

As shown in FIG. 1, the high-pressure pump 11 aspirates brake fluid from a reservoir 11*a* of its own and pumps the pressure fluid (brake fluid) into the line system which with the four-channel hydraulic unit shown in FIG. 1 with a plunger system for separate ABS operation therefore also has four partial hydraulic units 10*a*, 10*b*, 10*c* and 10*d*, with the pump high pressure reaching the partial hydraulic units via the 3/3-way magnetic ABS valves 14*a*, 14*b*, 14*c* and 14*d* shown. Securing the high-pressure line against overly high pressures is effected via a pressure limiting valve 11*b*. The two overall closed brake circuits I and II may each operate on one axle, or may be diagonally arranged.

A corresponding three-channel hydraulic unit can easily be made from what is shown in FIG. 1, by omitting the partial hydraulic unit 10*d*; in that case the sole partial hydraulic unit 10*b* remaining for brake circuit II acts upon both associated wheel brake cylinders $RZII_1$ and $RZII_2$. The dividing line 50 shown in broken lines in FIG. 1 illustrates the configuration for this case of a three-channel hydraulic unit; in that case, as indicated in parentheses, the second wheel brake cylinder for that brake circuit is also added to the partial hydraulic unit 10*b*.

Figure 3:
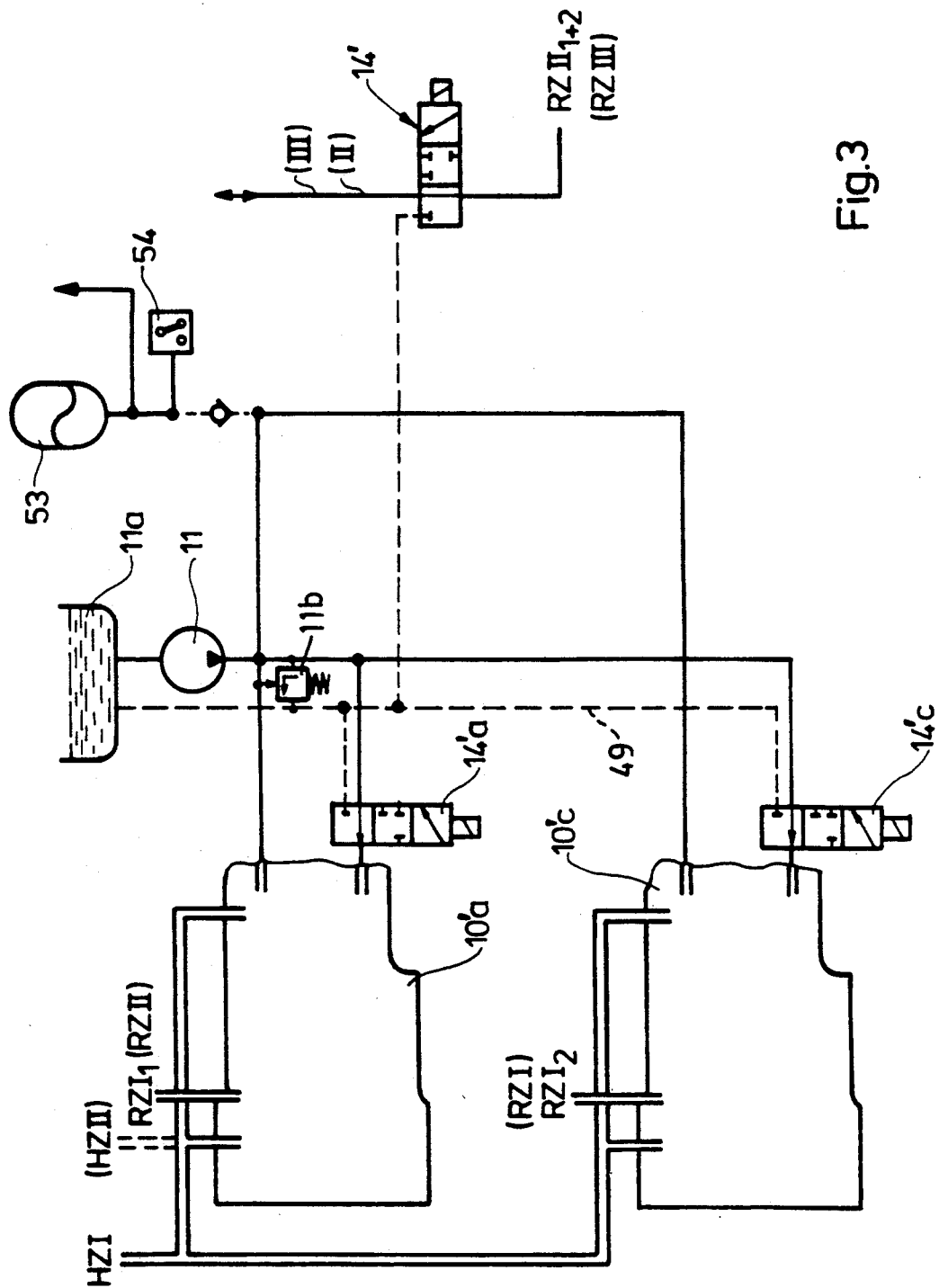
FIG. 3 shows a further embodiment of a plunger system for separate ABS, for a first closed brake circuit of a brake that has a high-pressure booster with an open (dynamic) second brake circuit, and a modified two-channel plunger ABS system for use with motorcycles.

The systems described thus far have essentially been intended for use with conventional master brake cylinders; in combination with a dual circuit brake comprising one closed brake circuit and one open brake circuit, an ABS system can be achieved at considerably more favorable cost, as shown in FIG. 3. Here two partial hydraulic units 10'a, 10'c are provided for the first closed brake circuit I, and a single 3/3-way magnetic ABS valve 14' has been provided for the open brake circuit II, which valve is incorporated into the connecting line between the brake valve of the master brake booster and the two connected wheel brake cylinders RZII$_1$ and RZII$_2$. In this arrangement, the ABS control, via the ABS magnetic valve 14', causes relatively weak feedback effects, which originate in this open brake circuit II.

By making some modifications in the basic structure of the hydraulic unit of FIG. 3, which are also included in this drawing figure and represented by reference numerals in parentheses, a corresponding plunger system can also be made for a triple circuit brake system having one open brake circuit. To this end, each of the partial hydraulic units 10'a, 10'c of FIG. 3 forms its own brake circuit with a connection to the master brake cylinder line HZI or HZII, respectively, omitting the connecting partial line 51; the wheel brake cylinder RZII of the closed brake circuit II is connected to the partial hydraulic unit 10'a, the wheel brake cylinder RZI of the closed brake circuit I is connected to the partial hydraulic unit 10'c, and the wheel brake cylinder RZIII of brake circuit III is connected to the output line of the open brake circuit III, into which the 3/3-way magnetic ABS valve 14' is incorporated. The primary difference from the basic form of FIG. 3 is therefore the separate inlets of two master cylinder lines HZI and HZII.

It is also possible to use the pressure supply via the high-pressure pump 11, provided for the control concepts of FIG. 3, as a pressure supply for a hydraulic brake booster, given a suitable design. To this end, an additional pressure reservoir 53 is provided, having a pressure switch 54 for the switching on of the high-pressure pump 11, which is done depending on the pressure level desired; the reservoir and pressure switch may be selectively disposed in the separate hydraulic unit for the dual- or triple-circuit brake shown in FIG. 3, or in the brake booster. In the latter case, there are resultant advantages in terms of the dynamics and the booster and the pressure load on the pressure hose.

Finally, the layout of FIG. 3 also includes the possibility of using the invention for motorcycles, in the form of a two-channel plunger-type ABS system; the supply lines of the two master cylinder lines HZI and HZII to the closed brake circuits of the partial hydraulic units 10'a and 10'c are then laid out as in the three-channel hydraulic unit, except that the open brake circuit III is omitted completely, along with the ABS magnetic valve 14' of the earlier version. In that case, each of the partial hydraulic units 10'a, 10'c supplies its own associated wheel, as indicated by the wheel brake cylinder associations RZI and RZII shown in parentheses in FIG. 3.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for feedback-free ABS control in hydraulic brakes for vehicles, comprising: operating a brake pedal of a pedal-actuated master brake cylinder and at least one wheel brake cylinder connected thereto via associated normally open shutoff valves to enable a normal braking operation, during an ABS operation furnishing fluid pressure to actuate actuating pistons (21) to close said shutoff valves (12) to prevent pressure fluid communication between the master cylinder (16) and the at least one wheel brake cylinder (18), such actuation adapted to simultaneously open a pressure fluid communication between a plunger-piston (40) and the at least one wheel brake cylinder, said plunger-piston being acted upon by fluid pressure via an ABS magnetic control valve (14, 14a, 14b, 14c, 14d, 14'a, 14'c), and thereafter supplying the wheel brake cylinder (18) with fluid pressure, and applying a fluid pressure from the pedal-actuated master brake cylinder to a compensation face area (48) associated with said actuating pistons.

2. A method in accordance with claim 1, which comprises supplying four pressure faces to the actuating pistons (21), for mutual pressure equalization, so that a pressure face of an actuating rod (21a) carried thereby is acted upon by a pressure of the plunger-piston; arranging a restoring-spring-loaded front face (46) of the actuating piston to be acted upon by a pressure fed by the ABS magnetic valve (14); so that a rear face of the actuating piston (21) is acted upon directly by a pressure of a high-pressure pump (11) that starts upon onset of ABS control and wherein the compensation face area acted upon by the master brake cylinder pressure is equal to the pressure face area of the actuating rod.

3. The method in accordance with claim 1 which comprises, supplying pressure fluid from the ABS control valve (14, 14a, 14b, 14c, 14d) to the plunger-piston (40) in throttled fashion for dynamic fine tuning.

4. An apparatus for feedback-free ABS control in hydraulic brakes for vehicles, comprising a pedal-actuated master brake cylinder and at least one wheel brake cylinder connected thereto via at least one shutoff valve for enabling a normal braking operation, said at least one wheel brake cylinder also being associated with at least one plunger-piston and said at least one shut-off valve (12) is provided with an actuating piston (21) which opens at least one fluid pressure flow valve element to permit pressure fluid communication between the master cylinder (16) and the at least one wheel brake cylinder (18) for normal braking operation, for performing ABS functions said actuating piston is operative to close said pressure flow valve element to prevent fluid flow between said master cylinder and said at least one wheel brake cylinder and to simultaneously open a pressure fluid communication between said at least one plunger-piston (40), acted upon by an ABS magnetic control valve (14, 14a, 14b, 14c, 14d, 14'a, 14'c), and the at least one wheel brake cylinder (18), and said actuating piston includes a pressure compensation face (48) that is acted upon by the fluid pressure of the pedal-actuated master brake cylinder during normal braking operation and during ABS operation.

5. An apparatus as defined by claim 4, in which said actuating piston (21) of said shutoff valve (12) which effects the switchover between the master brake cylinder and the at least one wheel brake cylinder or the at least one plunger piston and the at least one wheel brake cylinder in the ABS mode is provided with an actuating rod pressure face, a restoring-spring-loaded front side (46), a back side (47), and the compensation face (48) acted upon by the master cylinder pressure, wherein the pressure compensation face (48) and the rod face (45) are of equal size, and a control pressure of a high-pressure charge pump (11), which is independent in its pressure level of the pressure of the master brake cylinder, acts upon the back side of the actuating piston (21), and the same control pressure but switched via the action of the ABS control valve (14) acts upon the restoring-spring-loaded front side (46).

6. An apparatus as defined by claim 5, in which in the ABS mode the rod face (45) is acted upon by the control pressure, dependent on the switching behavior of the control valve (14), which prevails in the area of a plunger-piston work chamber (41) associated with the at least one wheel brake cylinder.

7. An apparatus as defined by claim 6, in which an actuating rod (21a), of the actuating piston (21) determines the position of said valve element, embodied as a valve ball (29), of a 3/2-way shutoff valve, and further that the valve ball has first and second seats (21, 30) opposed to one another in an axial direction.

8. An apparatus as defined by claim 7, in which the plunger-piston (40) that steps up the pressure, delivered to it by the ABS control valve (14), substantially at the same ratio (1:1) and delivers it to the wheel brake cylinder in the case of a pressure increase is disposed in the same housing as the shutoff valve (12), with suitable internal connecting channels (27, 44a) disposed between the area of the plunger-piston and the shutoff valve.

9. An apparatus as defined by claim 6, in which the high-pressure charge pump (11), that starts up upon the onset of ABS control, with an associated pressure limiting valve (11b), draws from an associated pressure fluid reservoir (11a) and delivers the pumped pressure fluid directly to the back side of the actuating piston and to the restoring spring-loaded front side (46) as a function of a respective switching function (A, B, C) of a 3/3-way ABS magnetic control valve (14).

10. An apparatus as defined by claim 6, in which the plunger-piston (40) that steps up the pressure, delivered to it by the ABS control valve (14), substantially at the same ratio (1:1) and delivers it to the wheel brake cylinder in the case of a pressure increase is disposed in the same housing as the shutoff valve (12), with suitable internal connecting channels (27, 44a) disposed between the area of the plunger-piston and the shutoff valve.

11. An apparatus as defined by claim 5, in which an actuating rod (21a), of the actuating piston (21) determines the position of said valve element, embodied as a valve ball (29), of a 3/2-way shutoff valve, and further that the valve ball has first and second seats (21, 30) opposed to one another in an axial direction.

12. An apparatus as defined by claim 11, in which the high-pressure charge pump (11), that starts up upon the onset of ABS control, with an associated pressure limiting valve (11b), draws from an associated pressure fluid reservoir (11a) and delivers the pumped pressure fluid directly to the back side of the actuating piston and to the restoring spring-loaded front side (46) as a function of a respective switching function (A, B, C) of a 3/3-way ABS magnetic control valve (14).

13. An apparatus as defined by claim 11, in which the plunger-piston (40) that steps up the pressure, delivered to it by the ABS control valve (14), substantially at the same ratio (1:1) and delivers it to the wheel brake cylinder in the case of a pressure increase is disposed in the same housing as the shutoff valve (12), with suitable internal connecting channels (27, 44a) disposed between the area of the plunger-piston and the shutoff valve.

14. An apparatus as defined by claim 5, in which the high-pressure charge pump (11), that starts up upon the onset of ABS control, with an associated pressure limiting valve (11b), draws from an associated pressure fluid reservoir (11a) and delivers the pumped pressure fluid directly to the back side of the actuating piston and to the restoring spring-loaded front side (46) as a function of a respective switching function (A, B, C) of a 3/3-way ABS magnetic control valve (14).

15. An apparatus as defined by claim 5, in which the plunger-piston (40) that steps up the pressure, delivered to it by the ABS control valve (14), substantially at the same ratio (1:1) and delivers it to the wheel brake cylinder in the case of a pressure increase is disposed in the same housing as the shutoff valve (12), with suitable internal connecting channels (27, 44a) disposed between the area of the plunger-piston and the shutoff valve.

16. An apparatus as defined by claim 4, in which an actuating rod (21a), of the actuating piston (21) determines the position of said valve element, embodied as a valve ball (29), of a 3/2-way shutoff valve, and further that the valve ball has first and second seats (21, 30) opposed to one another in an axial direction.

17. An apparatus as defined by claim 16, in which the valve ball (29), which in the case of ABS functions is pressed by the actuating rod (21a) of the actuating piston (21) against a first seat (30), is adapted to interrupt communication between the master brake cylinder and the at least one wheel brake cylinder connected to it without feedback, and simultaneously by lifting from its second seat (31) is arranged to establish communication between an associated work chamber (41) of a plunger-piston (40) and the at least one wheel brake cylinder, wherein a front end of the actuating rod (21a) that is operatively connected to the valve ball (29) is disconnected from the actuating piston and guided in a sealed manner through a stationary intermediate stopper (25).

18. An apparatus as defined by claim 16, in which the high-pressure charge pump (11), that starts up upon the onset of ABS control, with an associated pressure limiting valve (11b), draws from an associated pressure fluid reservoir (11a) and delivers the pumped pressure fluid directly to the back side of the actuating piston and to the restoring spring-loaded front side (46) as a function of a respective switching function (A, B, C) of a 3/3-way ABS magnetic control valve (14).

19. An apparatus as defined by claim 16, in which the plunger-piston (40) that steps up the pressure, delivered to it by the ABS control valve (14), substantially at the same ratio (1:1) and delivers it to the wheel brake cylinder in the case of a pressure increase is disposed in the same housing as the shutoff valve (12), with suitable internal connecting channels (27, 44a) disposed between the area of the plunger-piston and the shutoff valve.

20. An apparatus as defined by claim 16, in which a prestressing spring (37) is provided to press the valve ball (29) against the second seat (31) and maintain the hydraulic communication open between the master cylinder and the respectively connected wheel brake cylinder.

21. An apparatus as defined by claim 16, in which a prestressing spring (38) that returns the actuating piston (21) and actuating rod (21a) to its ABS control-free position is located in a free chamber (45) formed by a tapering of the actuating piston to its actuating rod and closed off by an intermediate stopper (25).

22. An apparatus as defined by claim 4, in which a throttle (43) is disposed in an actuation side between at least one plunger-piston (40) and the ABS magnetic control valve (14), for fine tuning of the ABS control.

23. An apparatus as defined by claim 4, in which in order to form a four-channel hydraulic unit with two brake circuits (I, II) connected to it, a total of four partial hydraulic units (10a, 10b, 10c, 10d) formed of a shutoff valve, a plunger-piston and an associated ABS control valve (14a, 14b, 14c, 14d) are provided, and two at a time of the partial units (10a, 10c; 10b, 10d) are acted upon by a master cylinder line (HZI; HZII).

24. An apparatus as defined by claim 4, in which in order to form a three-channel hydraulic unit with two closed brake circuits, two first partial hydraulic units (10a, 10c) are arranged to communicate with a common master brake cylinder line (HZI) and a third partial hydraulic unit (10b) is adapted to communicate with a second master brake cylinder line (HZII), wherein said third partial hydraulic unit (10b) acts with an output connection upon two wheel brake cylinders (RZII$_1$; RZII$_2$) of at least two wheel brakes.

25. An apparatus as defined by claim 4, in which to form a dual-circuit brake comprising one closed and one open brake circuit (I, II), two partial hydraulic units (10'a, 10'c) for the closed brake circuit are arranged to communicate with a supply line (HZI) of the master brake cylinder and act each upon separate wheel brake cylinders (RZI$_1$, RZI$_2$) of the same closed brake circuit, and further that a second open brake circuit (II) controlled by a brake valve of the master brake cylinder, includes a separate conventional 3/3-way ABS control valve (14'), which is adapted to communicate with two other wheel brake cylinders (RZII$_1$; RZII$_2$) of the open brake circuit.

26. An apparatus as defined by claim 4, in which to form a triple-circuit brake, two partial hydraulic units (10'a, 10'c) are provided and each is adapted to communicate with separate master brake cylinder supply lines (HZI; HZII) for a first and a second closed brake circuit (I, II), and that a third open brake circuit (III) is formed, with a separate 3/3-way ABS control valve (14') incorporated into a connecting line of said third open brake circuit from a brake valve to at least one wheel brake cylinder connected thereto.

27. An apparatus as defined by claim 4, in which when hydraulic brake boosters are included, a pressure supply comprising a pressure reservoir (53) with an associated pressure switch (54) for a high-pressure pump (11) is provided, which elements are disposed either in a separate hydraulic unit or in a brake booster.

28. An apparatus as defined by claim 4, in which to form a two-channel separate plunger ABS for motorcycles, two partial hydraulic units (10'a, 10'c) each of which communicates with its own master brake cylinder line (HZI, HZII), are provided, each being associated with independently separate triggered 3/3-way ABS control valves (14'a, 14'c), wherein each of the partial hydraulic units (10'a, 10'c) is adapted to act upon at least one wheel brake cylinder (RZI, RZII) for a wheel.

* * * * *